United States Patent [19]
Saylor, Jr.

[11] Patent Number: 5,613,332
[45] Date of Patent: Mar. 25, 1997

[54] SLIP RESISTANT FLOOR MAT

[76] Inventor: Edward T. Saylor, Jr., 1025 33rd Ave., SW., Vero Beach, Fla. 32968

[21] Appl. No.: 431,823

[22] Filed: May 1, 1995

Related U.S. Application Data

[63] Continuation of Ser. No. 943,554, Sep. 11, 1992, abandoned.

[51] Int. Cl.[6] ................................................. E04F 11/16
[52] U.S. Cl. .................................................. 52/177; 52/181
[58] Field of Search ............................ 52/177, 179, 181, 52/811; 428/142, 143, 149, 325; 156/279

[56] References Cited

U.S. PATENT DOCUMENTS

| | | | |
|---|---|---|---|
| 2,057,171 | 10/1936 | Van Der Pyl | 52/181 X |
| 3,276,895 | 10/1966 | Alford | 428/241 |
| 3,565,661 | 2/1971 | Harrison | 156/209 X |
| 3,579,409 | 5/1971 | Shannon | 428/61 |
| 3,661,673 | 5/1972 | Merriam | 156/279 |
| 3,676,208 | 7/1972 | Griffin | 428/149 |
| 3,788,873 | 1/1974 | Detig | 428/143 |
| 3,917,501 | 11/1975 | Ferrucci et al. | 428/90 X |
| 4,018,944 | 4/1977 | Hallstrom et al. | 52/177 X |
| 4,205,109 | 5/1980 | France et al. | 428/150 |
| 4,272,211 | 6/1981 | Sabel | 52/181 X |
| 4,282,281 | 8/1981 | Ethen | 428/149 |
| 4,299,874 | 11/1981 | Jones et al. | 428/143 |
| 4,336,293 | 6/1982 | Eiden | 428/143 |
| 4,351,866 | 9/1982 | Mennesson et al. | 428/143 X |
| 4,467,007 | 8/1984 | Elgie | 428/142 |
| 4,528,231 | 7/1985 | Lund | 52/181 X |
| 4,555,292 | 11/1985 | Thompson | 156/279 |
| 4,584,209 | 4/1986 | Harrison | 428/149 X |
| 4,622,257 | 11/1986 | Thompson | 428/143 |
| 4,662,972 | 5/1987 | Thompson | 156/279 |
| 4,721,649 | 1/1988 | Belisle et al. | 428/325 |
| 4,725,494 | 2/1988 | Belisle et al. | 428/325 |
| 4,849,265 | 7/1989 | Ueda et al. | 428/142 X |

FOREIGN PATENT DOCUMENTS

| | | | |
|---|---|---|---|
| 2658730 | 6/1978 | Germany | 428/149 |

*Primary Examiner*—Suzanne L. Dino
*Attorney, Agent, or Firm*—Fay, Sharpe, Beall, Fagan, Minnich & McKee

[57] ABSTRACT

A floor mat has a slip resistant upper surface intended for foot traffic and a backing layer intended to lay across a surface on which the floor mat is supported. The core of the mat is a woven roving sheet of fiberglass. A layer of polyurethane is bonded to the fiberglass, and beads are projected to impact the polyurethane layer when it is soft and tacky. The beads are sintered ceramic beads having a high coefficient of friction. At first, the beads are partially embedded in the polyurethane layer, then the polyurethane is heated to further embed the beads to 60–90% into the polyurethane. This leaves the crowns of the beads exposed, and in combination with the intervening expanses of polyurethane provides a slip resistant surface.

11 Claims, 5 Drawing Sheets

SLIP RESISTANT FLOOR MAT

This is a Continuation In Part Application of U.S. Application Ser. No. 07/943,554, filed Sep. 11, 1992 now abandoned.

FIELD OF THE INVENTION

The invention relates to a slip resistant floor mat that maintains its slip resistance when wet.

BACKGROUND OF THE INVENTION

Hard floor surfaces are desired in many instances for durability and maintenance. Floors in high traffic areas must clean easily and withstand years of wear without losing their aesthetic appearance.

Recently, it has become apparent that hard floor surfaces, although easy to maintain and able to withstand heavy traffic are potentially slippery, especially when soiled or wet. This is a particularly critical problem for floors in areas around doorways and kitchens and bathrooms where a potential for wetness and soiling, including oil and grease, occurs.

It is well known to increase a floor's slip resistance by making the surface abrasive. This has been done, for example by adding sand to paint when painting concrete or the like. This is thought to help remedy a slippery floor surface since the surface coefficient of friction (COF) of sand is higher than that for paint. However, when the sand is mixed with the paint, the paint coats the sand thus reducing its (COF). To maintain an exposed surface of the sand, the sand can be broadcast on wet paint. This type of surface does not stand up to heavy traffic and may not be acceptable aesthetically, however. Further, these methods may be suitable for remedying a slippery exterior floor surface, such as concrete, but for interior floor surfaces that withstand heavy traffic, painting the floor with a grit containing paint is neither an effective nor an aesthetic solution to the slipperiness problem.

As an alternative to adding sand to paint, for example, it has been proposed to add glass spheres to a surface adhesive film, as shown in U.S. Pat. No. 3,676,208 to Griffin. According to this patent, an epoxy type of resin having many minuscule solid spheres such as glass beads contained therein is coated on the surface of a walkway to increase its slip resistance.

The prior art attempts to coat the surface of walkways to increase its slip resistance are disadvantageous from a practical view point in that the character of the surface of the floor is permanently changed as a result. Coating the surface of the floor also leads to a maintenance and floor care problem in that the surface of the floor is made to be abrasive and therefore difficult to clean. In particular, the more abrasive the surface of the floor is made for slip resistance, the more abrasive the floor is on cleaning equipment. Therefore, although slip, trip, and fall accidents continue to be a serious problem, there has been little interest in changing existing floor surfaces by applying coatings directly on the floor.

SUMMARY OF THE INVENTION

It is an object of the present invention to provide a floor mat that can be placed over a floor surface or walkway to increase the slip resistance of the surface. Floor mats have a versatility advantage in that they can be laid down in areas prone to having a slippery surface without physically altering the original surface of the floor or walkway. They can also be rolled up and set aside or removed from a floor in order to permit cleaning of the floor underneath the mat. This is particularly advantageous in a kitchen environment wherein it is critical to maintain a high state of cleanliness.

It is an object of the invention to provide a floor mat that is slip resistant and easily washable with ordinary cleaning equipment, such as brushes or mops. The surface of the floor mat must have a sufficiently high coefficient of friction (COF) to ensure slip resistance, but not so high that it becomes abrasive to cleaning equipment. Further, the floor mat surface must be relatively free of holes, depressions or other formations that would permit dirt to be trapped in the mat. It is also critical that the mat not be made porous so that it can withstand use in wet environments without supporting bacterial or fungal growth.

It is an object of the present invention to provide a floor mat that is durable yet light weight and flexible for easy handling and cleaning in a more convenient location. In order that the floor mat can be rolled-up, folded or otherwise set aside from time to time, it is necessary that a certain flexibility be provided in the floor mat. The flexibility required is similar to that commonly found in carpet, wherein the carpet can be rolled-up for moving and storage.

In the floor mat according to the present invention, the surface has beads embedded in a layer of flexible adhesive coated on a woven roving fiberglass sheet. The beads are embedded in the flexible adhesive layer with the top portion of the beads exposed. The exposed beads and intermediate expanses of adhesive provide a coefficient of friction sufficient to maintain high slip resistance even in wet conditions. Preferably, the beads are anchored in the adhesive by embedding greater than 60% of each bead, and preferably 75 to 90% of each bead within the adhesive so that only 10–40% of each bead is exposed.

In areas most susceptible to having slippery surfaces, such as kitchens, restaurants, commercial work areas and the like, the surface of the floor is exposed to not only water, but also harsh detergents, grease, oil and other materials. Such environments are potentially hazardous to the anchoring of the beads in the adhesive layer. Accordingly, it is an object of the invention to maintain secure adhesion of the beads to the surface of the floor mat in even the most caustic environments.

According to a preferred embodiment of the invention, the beads are coated with a silane before they are embedded in the adhesive layer in order to strengthen the bond between the beads and the adhesive. This in combination with the embedding of each of the beads to a depth of 60–90% into the mat ensures firm anchoring of the beads.

It is a still further object of the invention to provide a floor mat that is aesthetic in appearance wherein the appearance is effected by combining one or more beads of different colors to be embedded in the adhesive or by embedding the beads in a pattern by use of a mask.

According to a process for making the floor mat of the invention, a woven roving sheet of fiberglass is laminated to a sheet of polyurethane under heat. After the bonding, while the surface of the polyurethane layer is tacky and soft, beads of one or more colors are projected by a bead slinger up into the surface of the polyurethane in a controlled density or population and at a controlled rated of dispersion. The preferred density of beads is 600 beads per square inch, however they have been laid down with densities from 120 to 1,110 beads per square inch, depending on requirements.

Once the beads have been initially embedded in the polyurethane sheet, the surface of the polyurethane is heated to a predetermined temperature for a sufficient amount of time to embed the beads within the layer of polyurethane to the desired level, i.e., to ensure that 60 to 90% of each of the beads is embedded within the polyurethane layer. The greater the extent to which the beads are embedded, the easier the floor mat is to clean, since the surface is comprised mostly of bead crowns and polyurethane sheeting between the crowns. On the other hand, the more the beads are exposed, the greater the slip resistance, but the more difficult the floor mat is to clean and the more likely the beads are to become unanchored.

Once the fiberglass sheet has been laminated with the polyurethane and the beads embedded to the desired depth within the polyurethane by subsequent additional heating, backing coating is applied to the underside of the sheet of fiberglass. Any suitable backing materials can be used. A polyether urethane coating is preferred because of its good adhesion properties to the fiberglass, water resistance and good properties of flexibility and durability. Preferably, the polyether urethane is applied directly to the under side of the sheet of fiberglass to provide a coating 50–100 mils thick. The coating is then heat cured to finish the production of the floor mat. The resulting floor mat is durable, flexible and provides a slip resistant surface that is easily cleaned with ordinary cleaning equipment.

It is a further object of the invention to provide a floor mat of another embodiment of the invention having a surface with beads imbedded in a layer of flexible adhesive coated on a woven roving fiberglass sheet, and having a backing applied to the underside of the sheet of fiberglass that is formed of a foamed urethane. The foamed urethane backing provides a resilient, cushioning effect that reduces fatigue for those standing on such a mat for a long period of time. The foamed backing can range from ⅛ to ½ inch thick, depending upon the desired resilience. In a preferred embodiment, the foamed backing is approximately ¼ inch thick.

According to this embodiment of the invention, a commercially available foamed urethane backing can be applied to the underside of the sheet of fiberglass. Alternatively, a polyether urethane coating having microspheres or hollow spheres mixed therein can be applied to the underside of the sheet of fiberglass to achieve a thick resilient coating, for example from ⅛ to ½ inch thick. Still further, according to another embodiment of the invention, microspheres that expand after heating can be added to the polyether urethane and the mixture applied directly to the underside of the sheet of fiberglass to provide a coating that is then expanded in thickness to the ⅛ to ½ inch thickness range by controlling the heating during curing of the polyether urethane coating having the heat expanding microspheres contained therein.

It is an object of the invention to provide a floor mat having a surface with beads embedded in a layer of flexible adhesive coated on a woven roving fiberglass sheet and having a resilient backing layer formed of a closed cell foam material that prevents water or liquids from migrating through the backing material, so that the mat is suitable for use in wet or damp floor environments.

DETAILED DESCRIPTION OF THE PREFERRED EMBODIMENTS

Figure 1:
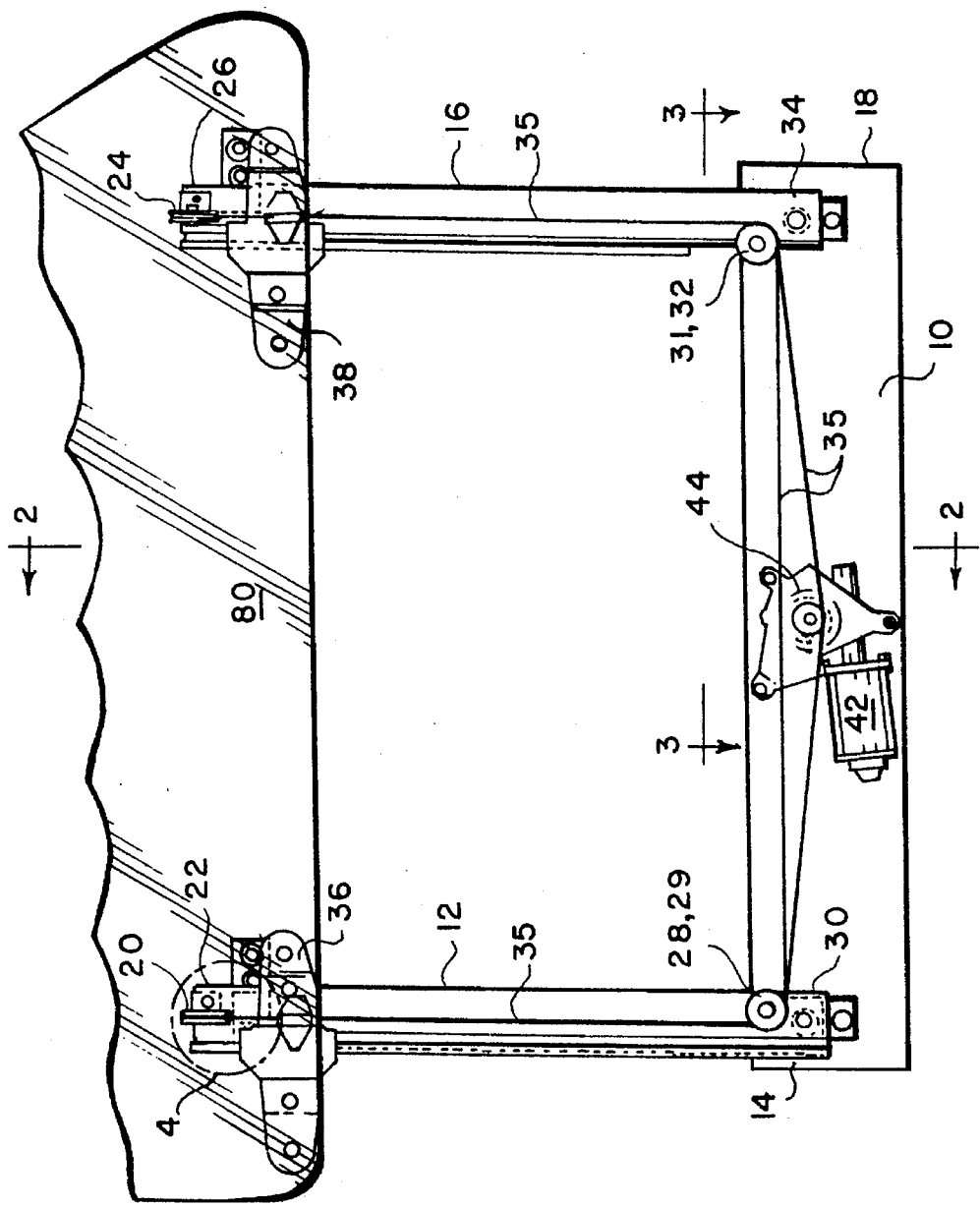
FIG. 1 is a cross-sectional view of a floor mat constructed according to an embodiment of the present invention.

A partial cross-sectional view of a floor mat 10 constructed according to the preferred embodiments of the invention is shown in FIG. 1. The mat is comprised of a sheet of woven roving fiberglass 14 having a layer of polyurethane 16 bonded on its one side with beads 12 embedded therein, and having a backing material 18 bonded to its other side. Accordingly, surface 9 of the mat is designed to be slip resistant in terms of foot traffic while the underside 11 of the mat is also designed to be slip resistant, but not in terms of slip resistance to foot traffic, but rather slip resistance to providing a high coefficient of friction between the mat and the surface on which the mat is supported. A high coefficient of friction on surface 9 results from the crowns 12a of beads 12 being exposed above the upper surface 16a of the polyurethane layer 16.

Upper surface 9 of mat 10 has a texture and surface contour that results from the woven roving fiberglass layer 14, which has a coarse weave forming in a criss-cross supporting surface on which the polyurethane layer is adhered, which will be explained further herein. The polyurethane layer partially assumes the criss-cross pattern of the fiberglass, which results in a wavy appearance to the upper surface 16a of the polyurethane layer. The surface is also textured by the crowns 12a of the beads, however the transition from bead crowns to the upper surface of the polyurethane layer is relatively smooth in that no holes or grooves are formed in the surface of the mat that would be likely to capture dirt or other contaminants. Accordingly, surface 9 of the floor mat 10 is easy to clean, while remaining slip resistant by virtue of its high coefficient of friction.

The beads 12 are preferably made of pelletized ceramic particles that are sintered in a rotary kiln to about 2,500° F., resulting in a toughness and hardness that is considerably greater than that for glass. Hardness of the ceramic beads is approximately 7.5 on the moh scale versus 5.5 moh for average glass. This produces a wear resistance equal to or better than floor tile, while providing a coefficient (COF) of friction above 0.5, even when wet.

The beads are preferably 15 to 40 mils in diameter dependent on application, and they are embedded in the polyurethane layer 16 by a process, explained hereinafter. The polyurethane layer 16 has an initial thickness of 15 to 20 mils, but the thickness changes as the result of displacement by the beads during the embedding step. In any event, the polyurethane layer is sufficiently thick to permit the beads 12 to be embedded therein from about 60 to 90% of their size or volume. This permits approximately 10 to 40% of each of the beads to be exposed for increasing the slip resistance of surface 9 of the mat.

Depending upon the application, the bead depth is controlled in consideration of the following. If the beads are embedded too deeply, the crowns 12a of the beads are insufficiently exposed and provide a decreased amount of slip resistance for the upper surface 9 of the mat. On the other hand, if the beads are not embedded deep enough in the polyurethane layer, the crowns 12a in combination with the upper surface 16a of the polyurethane layer create a textured surface that is more difficult to clean. Of course, if the beads are not embedded at least to 50% into the polyurethane layer, then the adhesion of the beads to the polyurethane layer is threatened, and there is a risk that these beads will eventually break loose from the mat, which is highly undesirable.

There is another consideration to embedding the beads in the polyurethane layer. Slip resistant floor mats are needed most in areas that are exposed to wet environments, and particularly in environments contaminated by detergents, oil, grease and the like. These contaminates tend to attack the adhesion or glue line where the polyurethane layer upper surface 16a meets the crown 12a. Prolonged contact with these contaminants tends to degrade adhesion between the polyurethane layer 16 and the beads 12, thus further exposing the beads and potentially tending to break the beads away from the mat. According to the present invention, the beads are embedded to preferably 70 to 90% of their size or volume in the polyurethane layer with just 10 to 30% of the bead crowns 12a being exposed. In this way, even prolonged exposure to contaminants attacking the adhesion or glue line does not tend to break loose the beads from the polyurethane layer.

According to a preferred embodiment of the invention, adhesion of the beads is further improved by adding a silane, for example, a gamma-glycidoxyproplytrimethoxysilane, which acts as a coupling agent to bond these beads to the polyurethane at the molecular level. This greatly enhances bead adhesion to the polyurethane, even when the floor mat is exposed to wetness and caustic agents that tend to break the bond between the beads and polyurethane layer at the adhesion or glue line level.

Prior art attempts to increase the slip resistance of an article have focused on increasing the abrasiveness of the surface of the article by incorporating irregularly shaped particles and abrasive materials on the surface. This has a disadvantage of making the surface very difficult to clean, particularly when the surface becomes heavily soiled with oils, greases, detergents and the like. In contrast to these types of efforts, the present invention incorporates a combination of smooth polyurethane and relatively smooth, rounded beads having a textured surface that is rough enough to have a high coefficient of friction. This permits the mat to be cleaned without excessively abrading the cleaning equipment. Further, since few holes or other deformations in the surface 9 of the mat are present, the surface is easy to clean. Also, in a wet environment, the wavy appearance to the surface of the mat caused by the coarse weave of the woven roving fiberglass 14 creates grooves that tend to help with channeling the liquid that wet the surface of the mat to keep pools of the liquid from forming. Thus, the floor mat of the present invention is slip resistant, easily cleaned and maintains its slip resistance when wet.

Typically, the floor mat 10 of the present invention is laid down over an area where wet, oily or greasy conditions are known to occur in order to provide slip resistance over that area. Such areas are typically found in kitchens, for example. Once the floor mat is laid down, it must be capable of being rolled-up or otherwise set aside from time to time in order to clean the original floor surface beneath it so that proper cleanliness is maintained. This requirement for rolling-up the floor mat poses a flexibility requirement. The difficulty in providing the flexibility for such a mat, resides in the tendency for the beads to be urged to pop out of the polyurethane layer when the floor mat is bent during folding or rolling-up of the mat. Also, the mat itself must be sufficiently durable to withstand forces that tend to shear or tear the mat.

By the present invention, the combination of the woven roving fiberglass 14 and the polyurethane layer 16 as well as the polyurethane backing layer 18 renders the mat 10 with considerable shear strength and tear strength, such that the mat constructed according to the preferred embodiment of the invention is not able to be shredded, torn or cracked during normal use, the measure of these properties being determined by one physically attempting to tear the mat apart by hand. Further, the flexible and durable properties of the mat constructed according to the preferred embodiments of the invention are maintained even when the mat is exposed to low temperature application, such as −20° F., which may be in encountered in exterior applications and walk-in freezers, for example.

At the core of the tear or shear strength property of the mat 10 is the woven roving fiberglass layer. The woven roving fiberglass is an at least a 16 ounce square yard material, and preferably 18 ounce per square yard material having a 5×7 weave (machine direction by cross machine direction). This type of fiberglass is heavier than commonly encountered fiberglass used for PC board construction, for example, which is approximately 8 ounces or less per square yard. The woven roving preferred for use in the present invention is constructed with a tight weave (5×7), which is tighter than the average woven roving, which is typically 4×5 and used in the construction and lay-up of fiberglass boat hulls, and the like. It has been found that a fiberglass mat of 8 ounces or less per square yard provides little resistance to shearing when saturated with resin, and mats constructed with a core of fiberglass of 8 ounces/sq. yd. or less tear easily with one's bare hands.

Saturation of the fiberglass with the polyurethane from both sides is required for the final product. Since the mat is likely to be partially immersed in liquids in some applications, it is important that the mat not take-up liquids. By saturating the fiberglass with the polyurethane, a relatively non-porous mat is formed, which will be explained in greater detail hereinafter.

Figure 2:
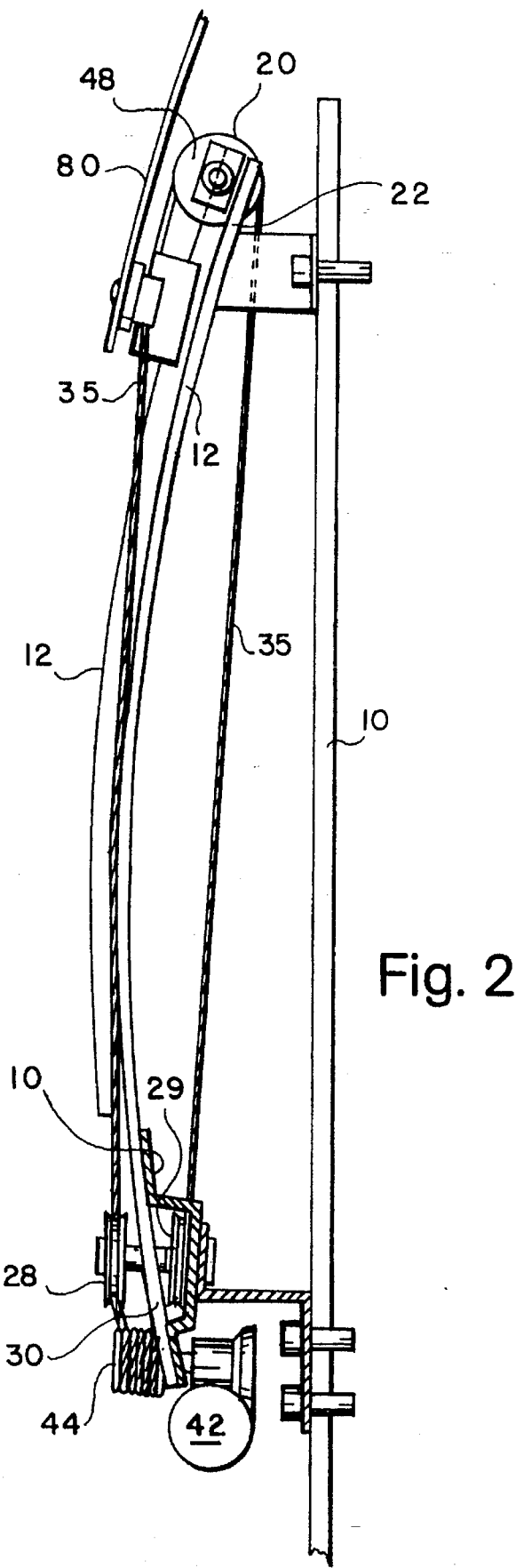
FIG. 2 is a schematic view of a process of making a slip resistant coating on a sheet of woven roving fiberglass.

According to the preferred embodiments, the floor mat of the present invention is constructed in two separate production lines, although the production lines could be joined, or further segmented, depending upon the production requirement. The first line is shown in FIG. 2, wherein a roll of woven roving fiberglass 14 is fed into overlapping relation with a roll of thermoplastic urethane 16 so that the two travel together through heater 20 arranged as shown schematically between rolls 22, 23. Heater 20 is set to bring the thermoplastic urethane up to or approaching 450° F. (exceeding the softening point) in order to promote adhesion of the urethane into the woven roving 14. Heater 20 heats the two layers by primarily convection heating for a period of time sufficient to bond the two layers together. Accordingly, the operating time and the temperature of heater 20 are carefully controlled to ensure good adhesion between the layers.

Figure 3:
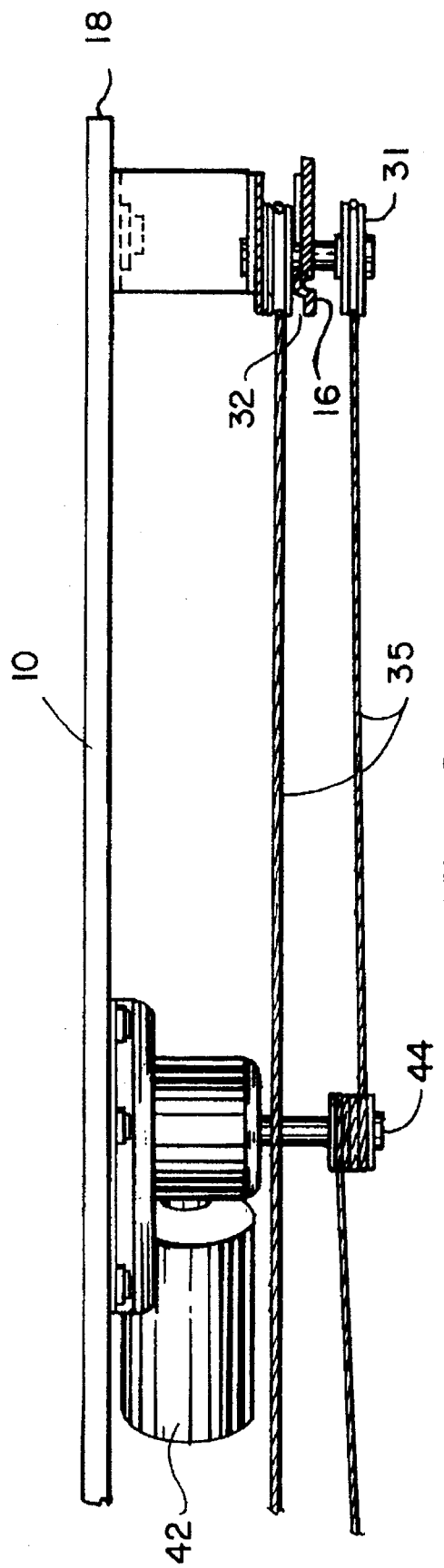
FIG. 3 is an enlarged side view showing details of the process of embedding beads in the polyurethane layer bonded to the fiberglass roving.

As the fiberglass and urethane combination exits heater 20, it passes along the line to a bead slinger 30, generally shown in FIG. 2 and shown in greater detail in FIG. 3. When the urethane layer 16 reaches the bead slinger 30, it is soft and tacky, and it faces downwardly into the bead slinging containment area 31.

Within containment area 31 is a paddle wheel 32 traveling in the direction of the arrow as shown. Paddle wheel 32 projects beads 12, which have been fed to the bottom 31a of the containment area, so that they impinge urethane layer 16, thereby embedding the beads in the urethane.

According to the present invention, it is significant to have the ability to control the bead dispersion or population density from between 120 beads per square inch to 1,100 beads per square inch. Controlling the density of the beads embedded in the urethane layer 16 is very important to the slip resistance of the resulting floor mat as well as the ruggedness and cleanability of the mat. Thus, several controls are incorporated in the bead slinger 30 to enable adjustment of the bead dispersion for population density with high accuracy.

First, the feed rate of beads 12 is controlled by controlling the speed of rotation of rectangular bar 35. As the beads flow out of hopper 34 along the sloped surface 31b of the containment area, they are fed past the rotating bar 35 into the bottom of the containment area 31a. Rapid rotation of paddle wheel 32 causes paddles 33 to strike the beads and throw them upwardly into the urethane layer 16.

As the paddle wheel 32 rotates, the beads are thrown upwardly at a rate that creates a cloud of beads 122 impinging the urethane layer 16. Most of the beads impact the urethane layer and are embedded therein, but a number of the beads are thrown into a first baffle plate 36 or even further into a second baffle plate 37. First baffle plate 36 is provided to keep the beads from flying out of the containment area 31, whereas second baffle plate 37 is adjustable. The angle of baffle plate 37 can be adjusted to cause deflected beads to land upstream of feed bar 35 or downstream therefrom. If the deflected beads are directed upstream of feed bar 35, then the beads are effectively removed from the cloud of beads 122 propelled upwardly by the paddle wheel until they are fed at a controlled rate (by feed bar 35) back into the bottom of the containment area 31. On the other hand, if the angle of baffle plate 37 is adjusted so that the deflected beads land downstream of the feed bar 35, then these recycled beads are quickly propelled upwardly again thus increasing the density of beads impinging on the urethane layer 16. By adjusting the speed of rotating feed bar 35, the speed of paddle wheel 32 and the angle of second baffle plate 37, a fine adjustment in the density of the cloud of beads 122 and a consequent fine adjustment in bead density or population can be achieved. Further, an even dispersion of the beads across the width of the traveling urethane layer is achieved by maintaining a constant and even supply of the beads across the width of the paddle wheel 32 from supply hopper 34.

Whereas an even dispersion of the beads 12 across the width of the mat is desired for maintaining a constant COF, it may be desirable in certain applications to embed the beads in a pattern for asthetic purposes. For example, a stationary mask having a plurality of slots extending in the direction of the path of travel of the fiberglass and polyurethane can be placed between the cloud of beads 122 and the polyurethane layer 16 to create a striped pattern of beads on the surface of the polyurethane layer 16. As another example, a mask that moves at the same speed as the fiberglass and polyurethane web that is being coated with beads can be placed between the cloud of beads 122 and the polyurethane layer 16. Such a moving mask could have a design that creates a tile pattern for even a more intricate design, depending upon the application. This mask could be provided as a pattern conveyor belt that passes in close proximity through the polyurethane layer 16 at the area of impingment of the cloud of beads 122, while moving at the same speed as the polyurethane layer 16.

Again referring to FIG. 2, once the beads have been embedded in urethane layer 16, the web travels around roll 24 (shown schematically) to enter a second heater 40. The purpose of providing a second heater 40 is to adjust the depth of immersion of the beads within urethane layer 16, and to control the rate of absorption of the urethane into the fiberglass. In particular, the beads are embedded into the urethane layer to a certain degree by the bead slinger 30, but the required depth of immersion must be carefully accomplished in order to achieve the preferred 60 to 90% immersion or embedding of the beads in the urethane layer. It has been found that the heating of the urethane layer by a radiant heater set at a high temperature, for example, 700° to 750° F., will soften the polyurethane layer 16 to an extend sufficient to permit the beads to settle deeper into the polyurethane layer under the force of gravity and to promote absorption of the urethane into the fiberglass.

Preferably, heater 40 is a radiant heater that heats the surface 16a of the polyurethane layer approaching 450° degrees for a short period of time, for example, 1 to 1 ½ minutes. The exact time and temperature are set in accordance with the preferred application. It is undesirable for the urethane layer 16 to become so hot as to be completely absorbed into the woven roving fiberglass layer 14, which may occur if too much heating time is permitted or if the temperature of the heater is set too high.

The preferred amount of absorbtion of urethane is determined from the consideration of the following objectives. First, a sufficient bond needs to be formed between the polyurethane layer and the fiberglass. Second, the underside surface 11 of the fiberglass must remain at least partially unsaturated in order for the backing material to bond sufficiently. Too much absorption of polyurethane into the fiberglass will prevent the backing layer from adhering well to the underside 11 of the fiberglass. On the other hand, insufficient absorption may cause voids or unsaturated fiberglass to exist in the product thus creating a potential porosity problem, which is quite undesirable, as explained.

It is preferable to control the temperature of the urethane layer during the second heating step by creating a differential temperature between surface 16a and the underside 15 of the fiberglass layer, which can be as low as 50°. In practice, the temperature differential is determined in accordance with the objective to control the absorption or saturation of the polyurethane layer 16 into the fiberglass layer 14.

Upon exiting heater 40, the urethane layer is permitted to cool so that the beads 12 are set in the urethane layer according to the desired final product parameters. Accordingly, the product passes over roll 47 (shown schematically) to a take-up roll 48.

Figure 4:
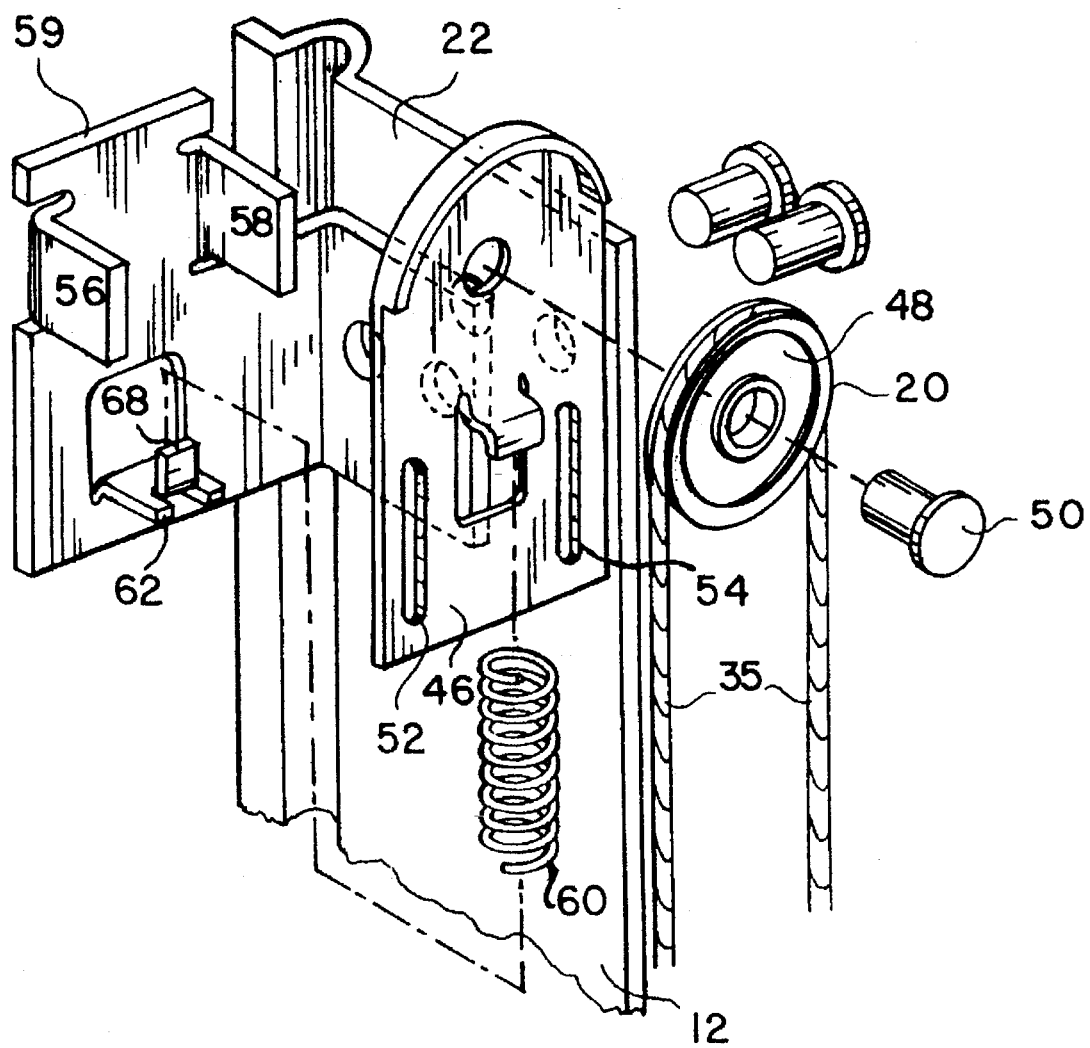
FIG. 4 is a schematic view of a process for adhering a backing composition to the bead coated fiberglass product made by the process shown in FIG. 2.

As shown schematically in FIG. 4, a backing material 18 is adhered to the underside 15 of fiberglass layer 14 to complete the floor mat composition. The process of applying the backing material begins with unspooling the fiberglass sheet and poyurethane layer bonded thereon from roll 48 onto a table 51. The backing compound is then applied through a mixer-nozzle 52, shown in greater detail in FIG.

6. Once the backing material is applied to the underside 15 of the fiberglass sheet. It is then smoothed out by cable smoothers 53, which are cables stretched across the width of the table 51 and slightly submerged in the backing material. At this point, of course, the backing material is liquid in form and the cable smoothers not only flatten the profile of the liquid, but also help release gas bubbles out of the material. Next, the process moves downstream to a blower 54 that forces a jet of air down onto the surface of the backing material for further driving out air bubbles formed along the surface of the material.

Downstream from the blower is a curing station 55, which includes a TEFLON belt 56 and heater block 57. Roller 56a is adjusted in height to set the thickness of the backing, which is preferably 50 to 100 mils, depending upon the application.

The TEFLON belt 56 maintains pressure on the backing material as it passes over the heater block 57, which is a conduction heater, providing a relatively low temperature heat supply to the polyurethane, for example 160° F. The heater block 57 can be heated by hot water, for example, but the temperature for curing the polyurethane backing material depends upon the cure temperature, which differs depending on the type of polyurethane product used.

Figure 5:
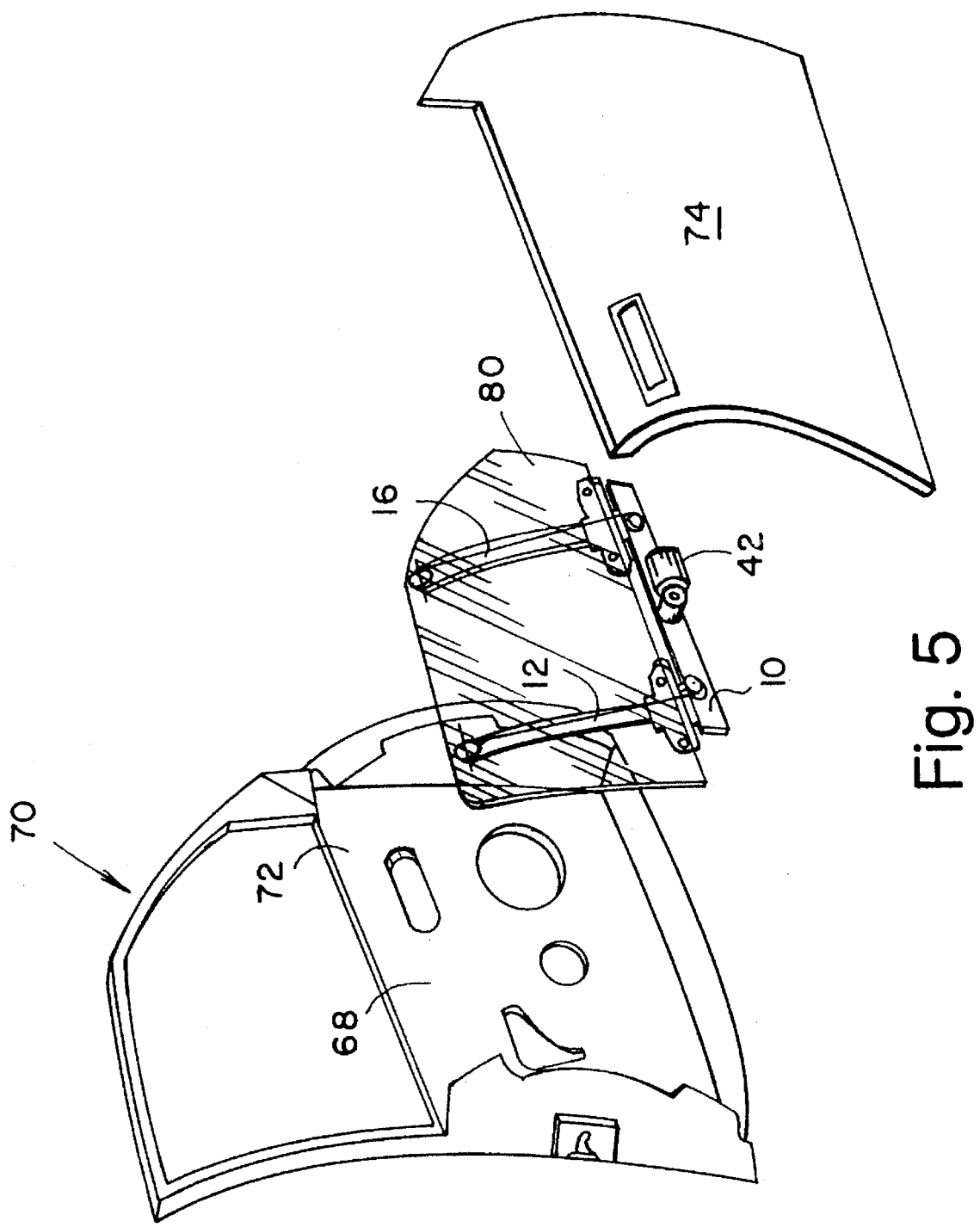
FIG. 5 is a diagram explaining the production of the backing material applied to the fiberglass roving.
Figure 1:
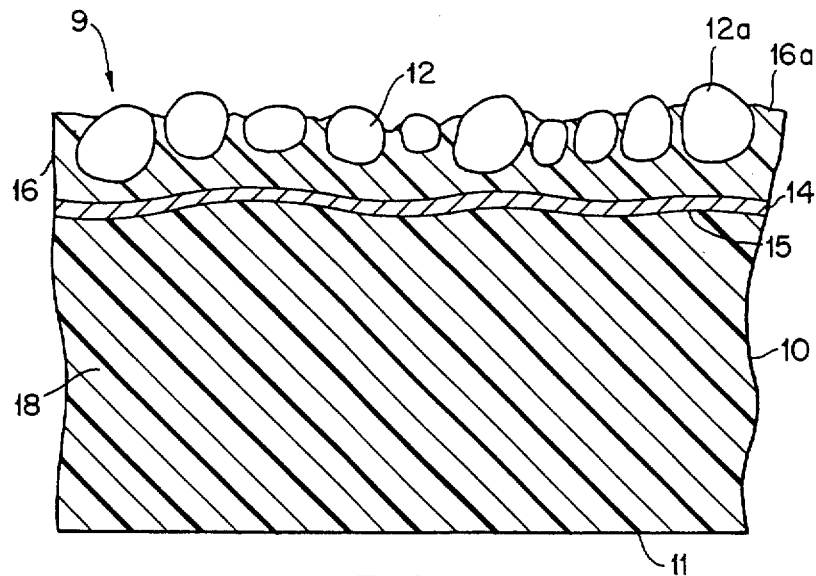
Figure 3:
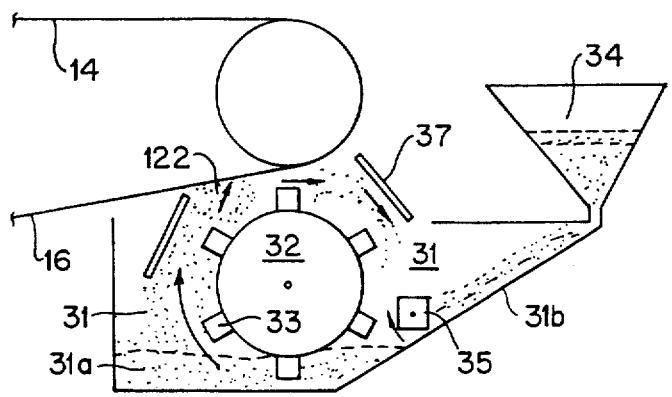
Figure 5:
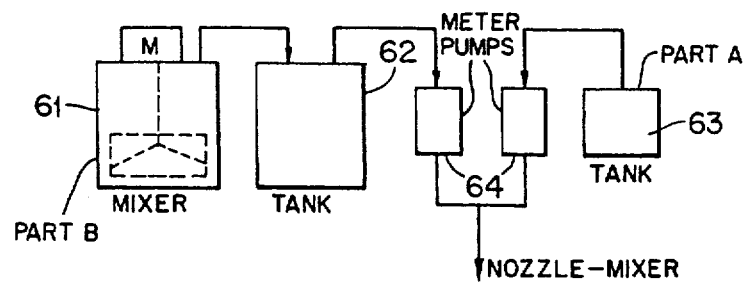

Upon exiting the curing station 55, the backing material is cured and the floor mat composition completed. The completed floor mat material is wound around take-up roll 60. In order to provide commercially marketable floor mats, the edges of the floor mat material stored on roll 60 are cut off and the floor mat cut inappropriate lengths With reference to FIG. 5, the composition and formation of the backing compound 18 will be discussed. First, the ingredients for the backing compound are mixed in a mixer 61. A polyol is mixed with a filler, such as clay or calcium carbonate. It is important that the additives to the polyol be as dry as possible to prevent the formation of gas bubbles. Also, a color additive can be added to the mixture. Mixer 61 is a high shear mixture that homogeneously combines the added ingredients. The mixture is pumped from mixer 61 into tank 62, and forms part B of a two-part polyurethane backing material.

The second part (part A) of the two-part polyurethane composition is isocyanate, which is contained in tank 63. Upon application of the polyurethane backing, the isocyanate from tank 63 and the polyol mixture from tank 62 are pumped through meter pumps 64 in carefully controlled quantities to be mixed together at the nozzle 52. Commercially available polyurethanes can be applied as the backing material, which polyurethane mixtures are heat curable at various temperatures. In a preferred embodiment, a 50–100 mil backing material is applied to the underside 15 of the fiberglass layer and has a curing temperature from room temperature to 160°–180°. Thus, after passing through the curing station 55 over heater block 57, the polyurethane is cured and the floor mat composition can be taken up by roller 60.

Figure 6:
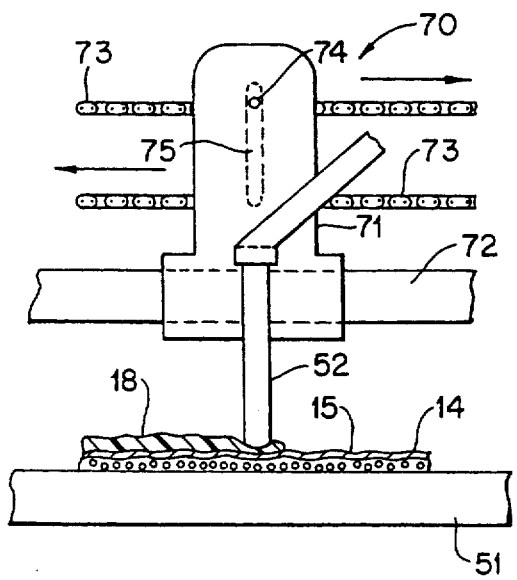
FIG. 6 is a diagram of an application device for applying the backing material to the underside surface of the fiberglass roving.

In a preferred embodiment of the invention, the backing material is directly applied to the underside 15 of the fiberglass layer. FIG. 6 shows a partial end view of the nozzle transport mechanism 70, which moves in reciprocation across the width of the table 51. The nozzle is mounted to a carriage 71 that is guided in movement along a shaft 72. The back and forth movement of carriage 71 is accomplished by pinning carriage 71 to a chain 73 at a pin joint 74 that travels in a slot 75 in the carriage. Thus, as the chain 73 travels between two sprockets (not shown), pin joint 74 moves up and down within slot 75 to cause the motion indicated by the arrows, as shown.

The reciprocating motion of nozzle 52 causes a slight zig-zag pattern to be formed on the fiberglass layer 14. This pattern is evened out by cable smoothers 53, and is therefore not noticeable in the final product.

The direct application device 70 shown in FIG. 6 is a preferred embodiment of the invention, but other application methods could be employed so long as a smooth layer 50–100 mils thick of backing material is applied along the underside 15 of fiberglass layer 14. The difficulty with direct application of the backing material is that the backing composition has a potentially fast curing time once it is mixed together in the nozzle-mixer 52. For this reason, the mixed material is deposited directly on the fiberglass rather than coating a moving web then rolling the glass into the resin, which is the usual practice. Conventional practice will not permit trapped air or process out gassing to escape through the nonporous polyurethane 16 which in turn can produce delamination of the backing and poroisity in the finished mat. According to the present invention, a floor mat material is constructed that is slip resistant, durable, flexible and easily cleaned with ordinary cleaning equipment. Whereas the disclosed preferred embodiment of the invention provides a backing material to the woven roving fiberglass, it is conceivable that the fiberglass could be cemented directly to a floor to provide a flooring surface that is slip resistant. A significant aspect of the invention, however, is the tear strength and durability, as well as flexibility of the fiberglass core of the mat when combined with a backing material. Use of the mat in areas known to be slippery is advantageous. In particular, the mat can be easily laid down over such areas and rolled-up again when it is necessary to clean the original floor surface beneath the mat, from time to time.

Figure 7:
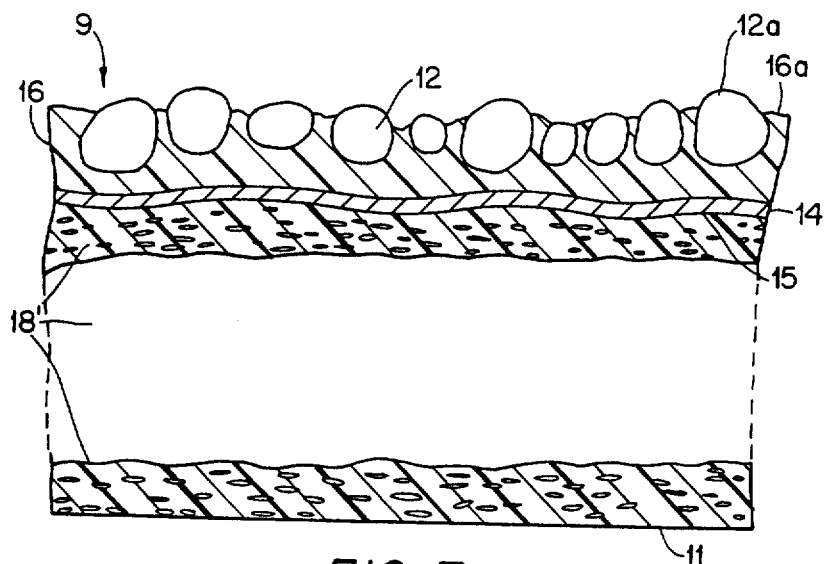
FIG. 7 is a cross-sectional view of a floor mat constructed according to an alternative embodiment of the present invention.

FIG. 7 shows an alternative embodiment of the present invention wherein the cross-sectional view of the mat according to this embodiment is similar to that shown in FIG. 1, with the difference being that the backing material 18' is a foamed urethane backing material that is more resilient than the solid urethane backing 18 shown in FIG. 1. The remainder of the construction is the same and is shown by like reference numerals, not requiring further explanation. The foamed urethane backing 18' is a commercially available backing material that is resilient because air pockets are formed in the material. The foamed backing is preferably secured to the underside 15 of fiberglass layer 14 after the beads 12 have been adhered to the fiberglass layer 14. Any suitable adhesive that bonds the fiberglass layer 14 to the foamed urethane backing 18' can be used for forming the mat shown in FIG. 7.

The floor mat according to the embodiment shown in FIG. 7 has a resilient backing that provides for relief from fatigue caused by standing on such a mat, for example by workers who perform various tasks in the standing position, such as dishwashers, cooks or cashiers. One disadvantage to using a foamed urethane backing, however, is that it has an open cell structure formed by the air pockets. That is, if the skin of the foamed urethane is cut or broken, one cell tends to be connected to another thus permitting the migration of water or other fluids through the backing layer. In an extreme example, the foamed urethane could become as absorbent as a sponge. However, the density of the foamed urethane can be increased so that the sponge effect is reduced while still maintaining some of the resilient feature of the backing material.

Figure 8:
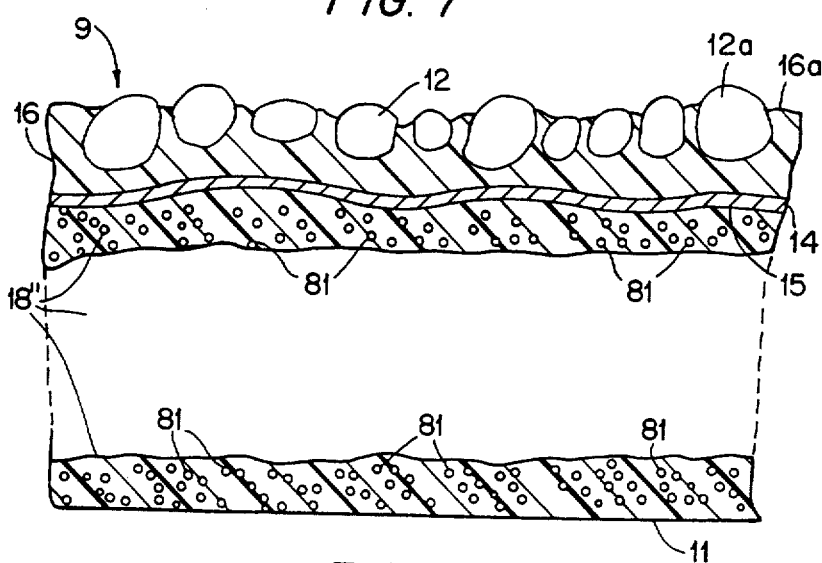
FIG. 8 is a cross-sectional view of a floor mat constructed according to yet another embodiment of the present invention.

FIG. 8 shows a further alternative embodiment of the invention. A floor mat, similar to that shown in FIG. 7 is shown having a resilient backing 18'' that has microspheres or hollow spheres contained within the backing material to provide resilience. The advantage of this construction over the embodiment of the invention shown in FIG. 7 is that the backing material, for example a urethane material having the microspheres contained therein, provides a closed cell system that is resistant to water migration. This is an advantage since the slip-resistant floor mats of the present invention are intended for use in damp or wet environments.

The spheres 81 can be microspheres, which are commonly 30 to 250 microns, for example, or hollow spheres, which are rubber or soft elastomer type spheres that are ¼ inch in diameter or more. Both types of spheres are commercially available. For example, the PQ corporation of Valley Forge, Pa. makes microspheres that are suitable for being included in the polyurethane backing material 18 of the first embodiment that is applied to the underside 15 of fiberglass layer 14. Further, Pierce and Stevens of Buffalo, N.Y. makes microspheres that are intended to be mixed into paints, for example, that are suitable for use in mixing into the backing material 18 to form the backing material 18'', according to the embodiment of the invention shown in FIG. 8. Another company providing such microspheres is Akzo Nobel of Duluth, Ga., which manufactures an EXPAND-CELL (TM) line of microspheres that are useful in the embodiment of the present invention.

The microspheres or hollow spheres that are included in the backing material 18'' can be of a finished size, according to one embodiment of the invention, and according to another embodiment may be included in the backing material as unexpanded microspheres or hollow spheres that expand when they are heated. If, according to the latter embodiment of the invention, the backing material 18'' includes microspheres that expand when heated, which are commercially available, then the backing material can be applied to the underside 15 of fiberglass material 14, as discussed with respect to the first embodiment of the invention, and then heated to a predetermined temperature (set forth by the manufacturer of the microspheres) to expand the thickness of the backing layer 18'' upon curing thereof.

In the embodiment of the invention set forth in FIGS. 7 and 8, it is preferred that the foamed backing layer or microsphere or hollow sphere containing backing layer be from ⅛ to ½ inch thick, depending upon the resilience required for the application of the floor mat. As an object of the invention, the microspheres or hollow spheres are included in the backing material 18'' as disclosed in FIG. 8, to make the backing material resilient. Therefore, the microspheres or hollow spheres that are selected must be made of a soft elastomeric material that is resilient yet tough. If hollow spheres are used, the balls should be encapsulated in soft urethane, which makes them resilient and soft, yet tough. Hollow spheres of up to ¼ inch in diameter can be encapsulated in a urethane backing material, such as the one disclosed with respect to FIGS. 5 and 6, to form the backing material 18'' shown in FIG. 8 of course, the backing material thus formed according to this embodiment would have a thickness greater than the diameter of the hollow spheres that are used.

According to the preferred embodiment of the invention disclosed in FIG. 8, the microspheres or hollow spheres comprise ½ or more of the backing material that is adhered to the underside 15 of the fiberglass sheet 14. This makes a resilient backing material that will withstand repeated load stress from persons standing on the floor mat while providing fatigue resistance to the person standing on the mat, as well as durability.

Although the invention is disclosed with respect to the many embodiments and with reference to the drawing, the invention is defined by the following claims.

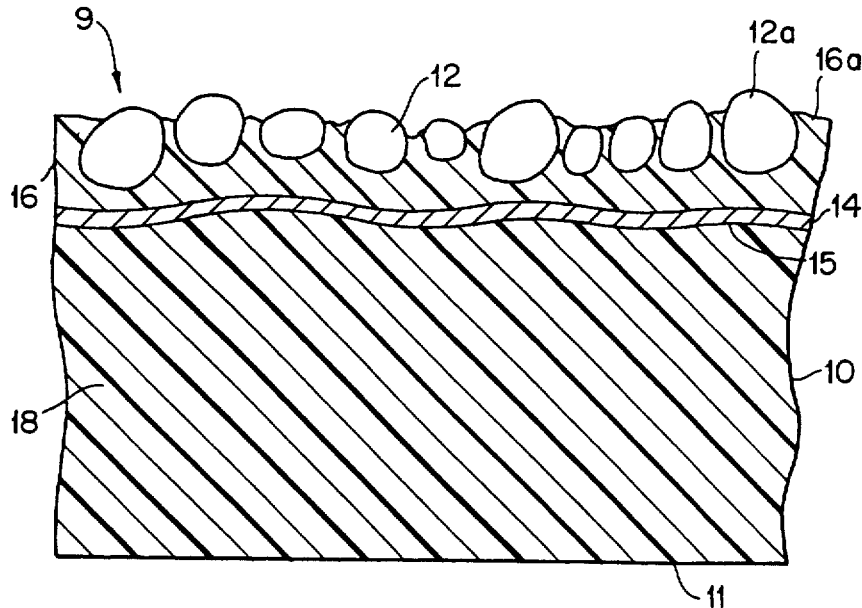

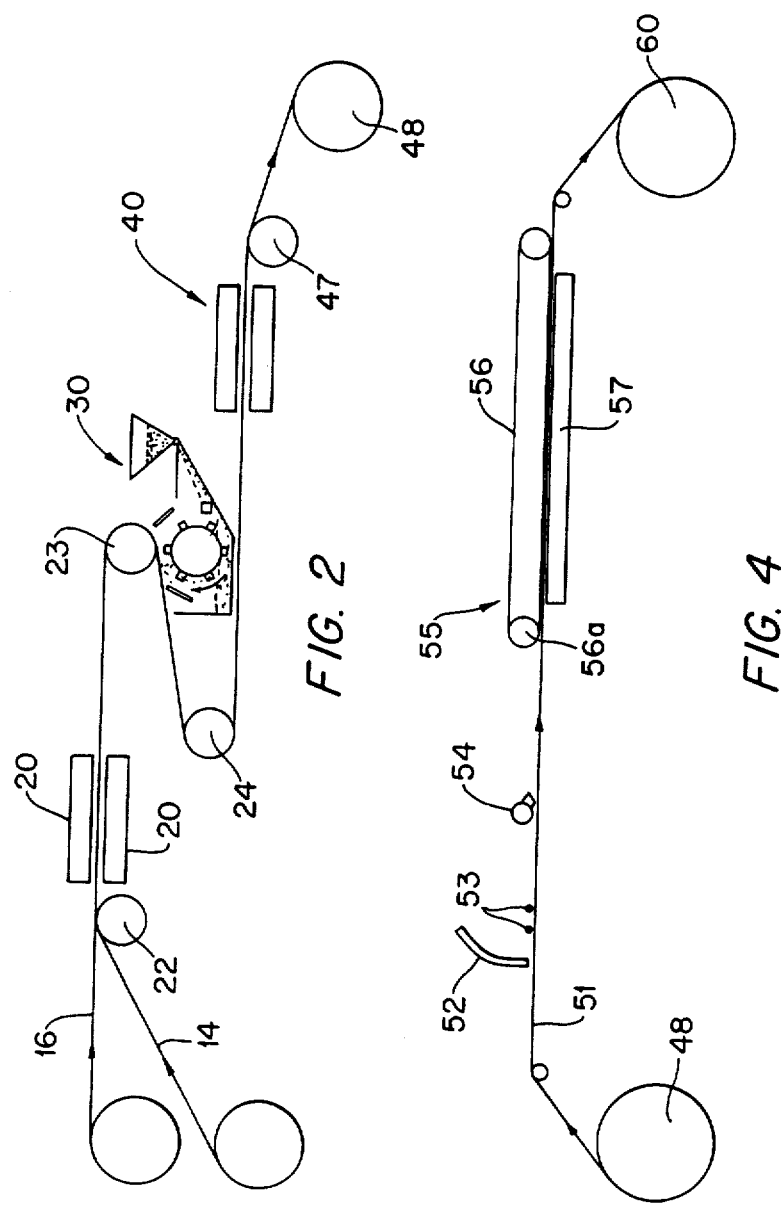

We claim:

1. A floor mat, comprising:

a woven roving sheet of glass fiber strands;

a layer of polyurethane bonded to one side of the sheet;

a plurality of evenly dispersed beads embedded in the polyurethane layer in a range of 200 to 1,100 beads per square inch, wherein the beads are sintered pelletized ceramic particles and wherein the beads are embedded 60–90% into the polyurethane with crowns of the beads being exposed; and a backing layer bonded to the other side of the sheet.

2. A floor mat according to claim 1, wherein said beads have a density of approximately 600 beads per square inch.

3. A floor mat according to claim 1, wherein said woven roving sheet is at least 16 ounces per square yard.

4. A floor mat according to claim 1, wherein said beads have an approximate hardness of 7.5 on the moh scale and have a diameter of 15 to 40 mils.

5. A floor mat according to claim 1, wherein said polyurethane layer has an initial thickness of 15 to 20 mils.

6. A floor mat according to claim 1, wherein said backing layer comprises a polyurethane mixed with a filler, said layer being 50–100 mils thick.

7. A floor mat according to claim 1, wherein said backing layer is a foamed urethane.

8. A floor mat, comprising:

a woven roving sheet of glass fiber strands;

a layer of polyurethane bonded to one side of the sheet;

a plurality of evenly dispersed beads embedded in the polyurethane layer in a range of 200 to 1,100 beads per square inch, wherein the beads are sintered pelletized ceramic particles and wherein the beads are embedded 60–90% into the polyurethane with crowns of the beads being exposed; and a backing layer bonded to the other side of the sheet having one of microspheres or hollow spheres embedded in the backing layer.

9. A floor mat according to claim 8, wherein said beads have a density of approximately 600 beads per square inch.

10. A floor mat according to claim 8, wherein said woven roving sheet is at least a 16 ounce per square yard woven fiberglass sheet.

11. A floor mat according to claim 8, wherein said beads are sintered pelletized ceramic particles having an approximate hardness of 7.5 on the moh scale and having a diameter of 15 to 40 mils.

\* \* \* \* \*

UNITED STATES PATENT AND TRADEMARK OFFICE
CERTIFICATE OF CORRECTION

PATENT NO. : 5,613,332
DATED : Mar. 25, 1997
INVENTOR(S) : Edward T. Saylor, Jr.

It is certified that error appears in the above-identified patent and that said Letters Patent is hereby corrected as shown below:

The title page should be deleted to appear as Per attached.

The Drawing sheets consisting of Figs, 1-5 should be deleted to appear as Per attached.

Signed and Sealed this

Sixth Day of May, 1997

*Attest:*

BRUCE LEHMAN

*Attesting Officer*   Commissioner of Patents and Trademarks

United States Patent

Saylor, Jr.

Patent Number: 5,613,332
Date of Patent: Mar. 25, 1997

[54] SLIP RESISTANT FLOOR MAT

[76] Inventor: Edward T. Saylor, Jr., 1025 33rd Ave., SW., Vero Beach, Fla. 32968

[21] Appl. No.: 431,823

[22] Filed: May 1, 1995

Related U.S. Application Data

[63] Continuation of Ser. No. 943,554, Sep. 11, 1992, abandoned.

[51] Int. Cl.⁶ .................................................. E04F 11/16
[52] U.S. Cl. ......................................... 52/177; 52/181
[58] Field of Search .............................. 52/177, 179, 181, 52/811; 428/142, 143, 149, 325; 156/279

[56] References Cited

U.S. PATENT DOCUMENTS

| | | | |
|---|---|---|---|
| 2,057,171 | 10/1936 | Van Der Pyl | 52/181 X |
| 3,276,895 | 10/1966 | Alford | 428/241 |
| 3,565,661 | 2/1971 | Harrison | 156/209 X |
| 3,579,409 | 5/1971 | Shannon | 428/61 |
| 3,661,673 | 5/1972 | Merriam | 156/279 |
| 3,676,208 | 7/1972 | Griffin | 428/149 |
| 3,788,873 | 1/1974 | Detig | 428/143 |
| 3,917,501 | 11/1975 | Ferrucci et al. | 428/90 X |
| 4,018,944 | 4/1977 | Hallstrom et al. | 52/177 X |
| 4,205,109 | 5/1980 | France et al. | 428/150 |
| 4,272,211 | 6/1981 | Sabel | 52/181 X |
| 4,282,281 | 8/1981 | Ethen | 428/149 |
| 4,299,874 | 11/1981 | Jones et al. | 428/143 |
| 4,336,293 | 6/1982 | Eiden | 428/143 |
| 4,351,866 | 9/1982 | Mennesson et al. | 428/143 X |
| 4,467,007 | 8/1984 | Elgie | 428/142 |
| 4,528,231 | 7/1985 | Lund | 52/181 X |
| 4,555,292 | 11/1985 | Thompson | 156/279 |
| 4,584,209 | 4/1986 | Harrison | 428/149 X |
| 4,622,257 | 11/1986 | Thompson | 428/143 |
| 4,662,972 | 5/1987 | Thompson | 156/279 |
| 4,721,649 | 1/1988 | Belisle et al. | 428/325 |
| 4,725,494 | 2/1988 | Belisle et al. | 428/325 |
| 4,849,265 | 7/1989 | Ueda et al. | 428/142 X |

FOREIGN PATENT DOCUMENTS

| | | | |
|---|---|---|---|
| 2658730 | 6/1978 | Germany | 428/149 |

Primary Examiner—Suzanne L. Dino
Attorney, Agent, or Firm—Fay, Sharpe, Beall, Fagan, Minnich & McKee

[57] ABSTRACT

A floor mat has a slip resistant upper surface intended for foot traffic and a backing layer intended to lay across a surface on which the floor mat is supported. The core of the mat is a woven roving sheet of fiberglass. A layer of polyurethane is bonded to the fiberglass, and beads are projected to impact the polyurethane layer when it is soft and tacky. The beads are sintered ceramic beads having a high coefficient of friction. At first, the beads are partially embedded in the polyurethane layer, then the polyurethane is heated to further embed the beads to 60–90% into the polyurethane. This leaves the crowns of the beads exposed, and in combination with the intervening expanses of polyurethane provides a slip resistant surface.

11 Claims, 4 Drawing Sheets